(12) United States Patent
Huang et al.

(10) Patent No.: US 9,590,460 B2
(45) Date of Patent: Mar. 7, 2017

(54) ELECTRIC MACHINE WITH A SLOT LINER

(71) Applicant: GE Aviation Systems LLC, Grand Rapids, MI (US)

(72) Inventors: Hao Huang, Troy, OH (US); Xiaochuan Jia, Centerville, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 610 days.

(21) Appl. No.: 13/957,885

(22) Filed: Aug. 2, 2013

(65) Prior Publication Data

US 2015/0035406 A1    Feb. 5, 2015

(51) Int. Cl.
*H02K 3/34* (2006.01)
*H02K 9/22* (2006.01)

(52) U.S. Cl.
CPC ............ *H02K 3/345* (2013.01); *H02K 9/22* (2013.01)

(58) Field of Classification Search
CPC ............................ H02K 3/345; H02K 3/487
USPC .......................................... 310/214–215, 260
See application file for complete search history.

(56) References Cited

U.S. PATENT DOCUMENTS

| | | | | |
|---|---|---|---|---|
| 2,173,726 A | * | 9/1939 | Prindle | H02K 3/345 156/308.2 |
| 2,473,332 A | * | 6/1949 | England | H02K 3/345 174/138 E |
| 3,130,335 A | * | 4/1964 | Rejda | H02K 3/345 174/DIG. 20 |
| 3,745,394 A | * | 7/1973 | Mason | H02K 15/10 310/215 |
| 4,151,436 A | * | 4/1979 | Smith | H02K 15/10 310/194 |
| 4,247,978 A | * | 2/1981 | Smith | H02K 3/345 29/596 |
| 7,015,396 B2 | | 3/2006 | Wada et al. | |
| 2005/0101695 A1 | | 5/2005 | Wada et al. | |
| 2012/0128988 A1 | | 5/2012 | Yokura et al. | |

FOREIGN PATENT DOCUMENTS

| | | |
|---|---|---|
| CN | 101888122 A | 11/2010 |
| GB | 631072 A | 10/1949 |
| GB | 772418 A | 4/1957 |
| GB | 812743 A | 4/1959 |
| JP | 18001373 Y | 2/1943 |
| JP | 59117434 A | 7/1984 |
| JP | 6166553 A | 4/1986 |
| JP | 10210694 A | 8/1998 |
| JP | 2003111328 A | 4/2003 |
| JP | 2011229283 A * | 11/2011 |

(Continued)

OTHER PUBLICATIONS

CA Office Action issued on Oct. 16, 2015 in relation to corresponding CA application 2857674.

(Continued)

*Primary Examiner* — Thanh Lam
(74) *Attorney, Agent, or Firm* — GE Global Patent Operation; William S. Munnerlyn (57) ABSTRACT

An electrical machine includes a rotor, a stator having a slot liner including an electrical insulator which extends beyond the stator ends, and a strengthening element provided at each of the slot liner ends, wherein the strengthening strip reduces the splitting of the corresponding slot liner end.

6 Claims, 6 Drawing Sheets

(56) References Cited

FOREIGN PATENT DOCUMENTS

WO    9740567 A1    10/1997

OTHER PUBLICATIONS

Unofficial English translation of Office Action issued in connection with corresponding JP Application No. 2014-145511 on Apr. 28, 2015.
Unofficial English Translation of Japanese Office Action issued in connection with corresponding JP Application No. 2014-145511 on Dec. 15, 2015.
GB Search Report and Written Opinion issued in connection with corresponding GB Application No. GB1413373.0 dated Jan. 2, 2015.
Great Britain Search Report issued in connection with corresponding GB Application No. 1413373.0 on May 25, 2016.

\* cited by examiner

ELECTRIC MACHINE WITH A SLOT LINER

BACKGROUND OF THE INVENTION

Slot liner materials are used in the stators of electric machines, such as generators and/or motors, to provide insulation between the stator core and the stator windings. In a rotary electrical machine, such as a generator or motor, the slot liner will separate stator windings, placed in the slots of a stator core, from the core. When operating, the slot liner provides electrical insulation of the stator windings from the core, while allowing heat generated in the stator windings due to current, to transfer from the stator windings to the stator core.

BRIEF DESCRIPTION OF THE INVENTION

In one aspect, an electrical machine includes a rotor, a stator having a core with at least one winding slot having an open top and terminating in opposing open ends, a slot liner provided within the winding slot and having an electrical insulating element defining an open top and terminating in opposing ends, which extend beyond the slot open ends, and a strengthening strip provided at each of the slot liner ends and solely on an outer surface of the electrical insulating element, wherein the strengthening strip reduces the splitting of the corresponding slot liner end during an automatic winding process.

In another aspect, an electrical machine including a rotor, a stator having a core with at least one winding slot having an open top and terminating in opposing open ends, a slot liner provided within the winding slot and having an electrical insulating element defining an open top and terminating in opposing ends, which extend beyond the slot open ends, and a strengthening strip provided at each of the slot liner ends and wrapping around the corresponding slot liner end from an inner surface to an outer surface, while residing entirely beyond the corresponding slot end, wherein the strengthening strip reduces the splitting of the corresponding slot liner end during an automatic winding process.

In another aspect, an electrical machine including a rotor, a stator having a core with at least one winding slot having an open top and terminating in opposing open ends, a slot liner provided within the winding slot and having an electrical insulating element defining an open top and terminating in opposing ends, which extend beyond the slot open ends, and a strengthening strip provided at each of the slot liner ends, wherein the electrical insulating element has a thermal conductivity of at least 290 mWatt/meter-K and the strengthening strip has at least an Elmendorf Tear measurement of 9.0.

DESCRIPTION OF EMBODIMENTS OF THE INVENTION

The invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to and electric machine providing a driving force and/or an electric machine providing both a driving force and power generation. Further, while this description is primarily directed toward an aircraft environment, the invention is applicable in any environment using an electric machine.

The description is further primarily directed towards an environment wherein the power generation is designed for a high power density, high efficiency, and high temperature electric machine. Thus the embodiments described herein define a higher steady-state operating temperature, such as a thermal class of power generation above 240° C. A steady state thermal class of 300° C. is envisioned, however higher and/or lower operating temperatures are envisioned as well.

Figure 1:
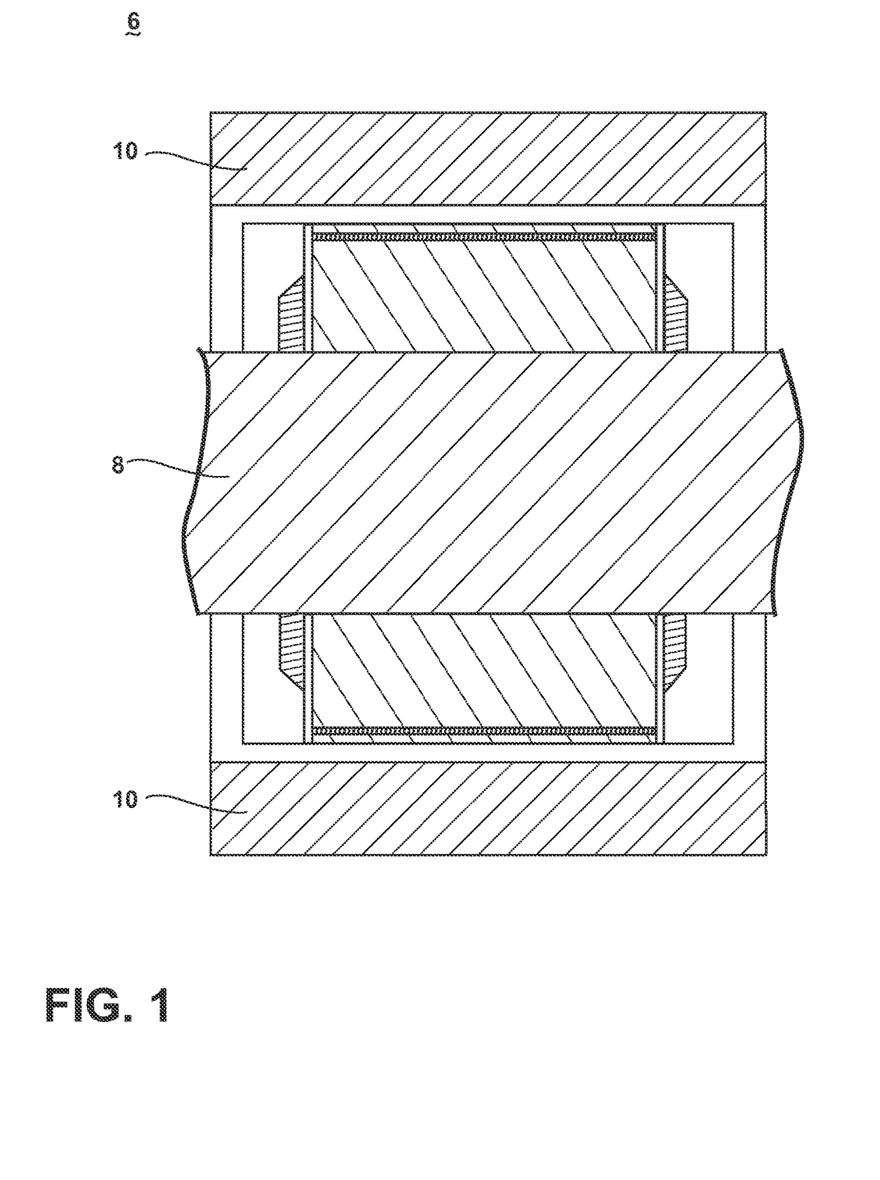
FIG. 1 is a sectional view of an electrical machine assembly.

As illustrated in FIG. 1, an embodiment of the invention is an electric machine 6 comprising a rotor 8 and a stator 10. The stator 10 is illustrated in greater detail in FIG. 2. The stator 10, as shown, comprises a generally cylindrical core 12, a plurality of teeth 14, at least one winding slot 16, and at least one slot liner 18 provided for at least some of the winding slots 16. The surface at the inner perimeter of the core 12 faces the rotor 8 and has a plurality of teeth 14 which are radially arranged at a predetermined spacing in the circumferential direction. The core 12 may be formed from a plurality of laminations, but alternate forming or machining of materials is envisioned.

Figure 2:
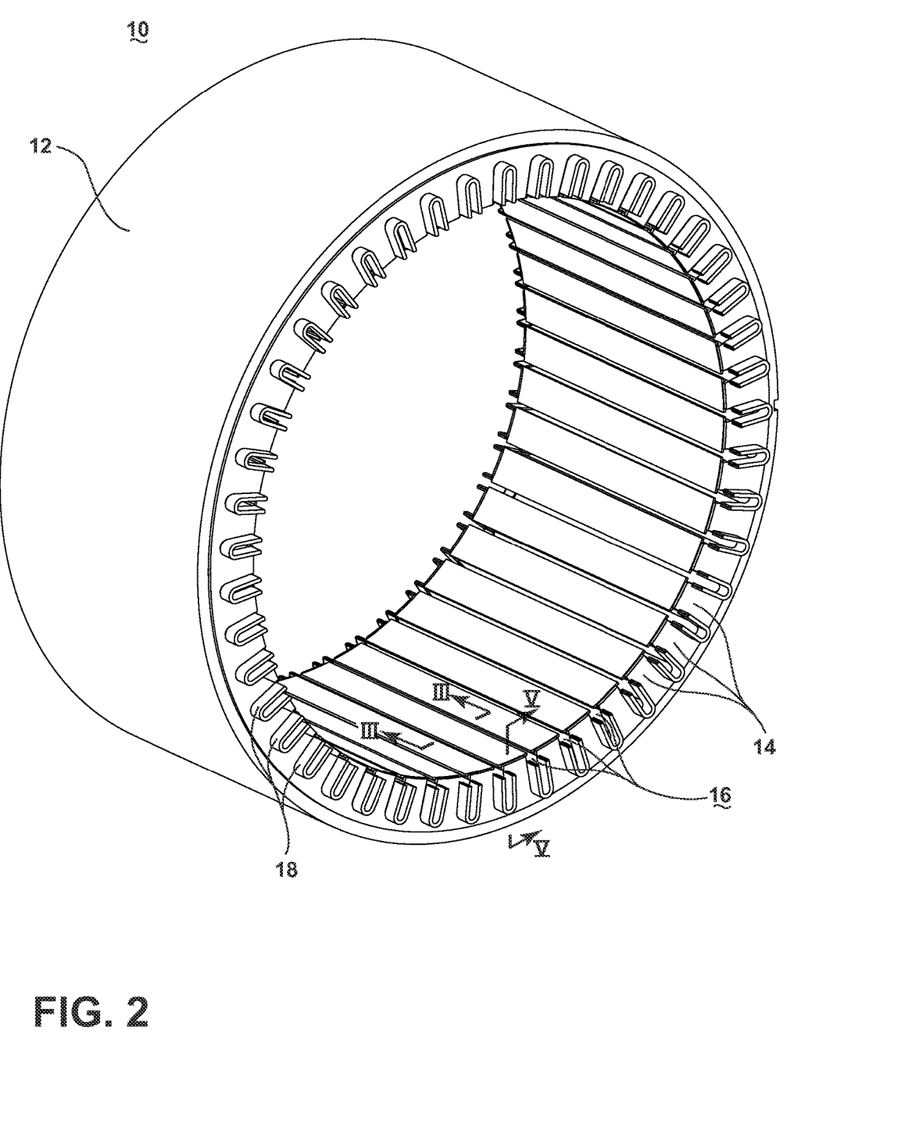
FIG. 2 is a perspective view illustrating a stator of an electric machine according to the first embodiment of the invention.

The core 12 further comprises at least one winding slot 16, defined by the space between adjacent teeth 14, having an open top facing the circumferential center point of the core 12 and terminating in opposing open ends spaced axially along the core 12. For instance, the ends of the winding slot 16 may axially terminate at the same length as the core 12. The slot liner 18 is placed along the inner perimeter of the winding slot 16 defining an open top facing the circumferential center point of the core 12 and terminating in opposing ends which extend beyond the winding slot 16 open ends.

Figure 3:
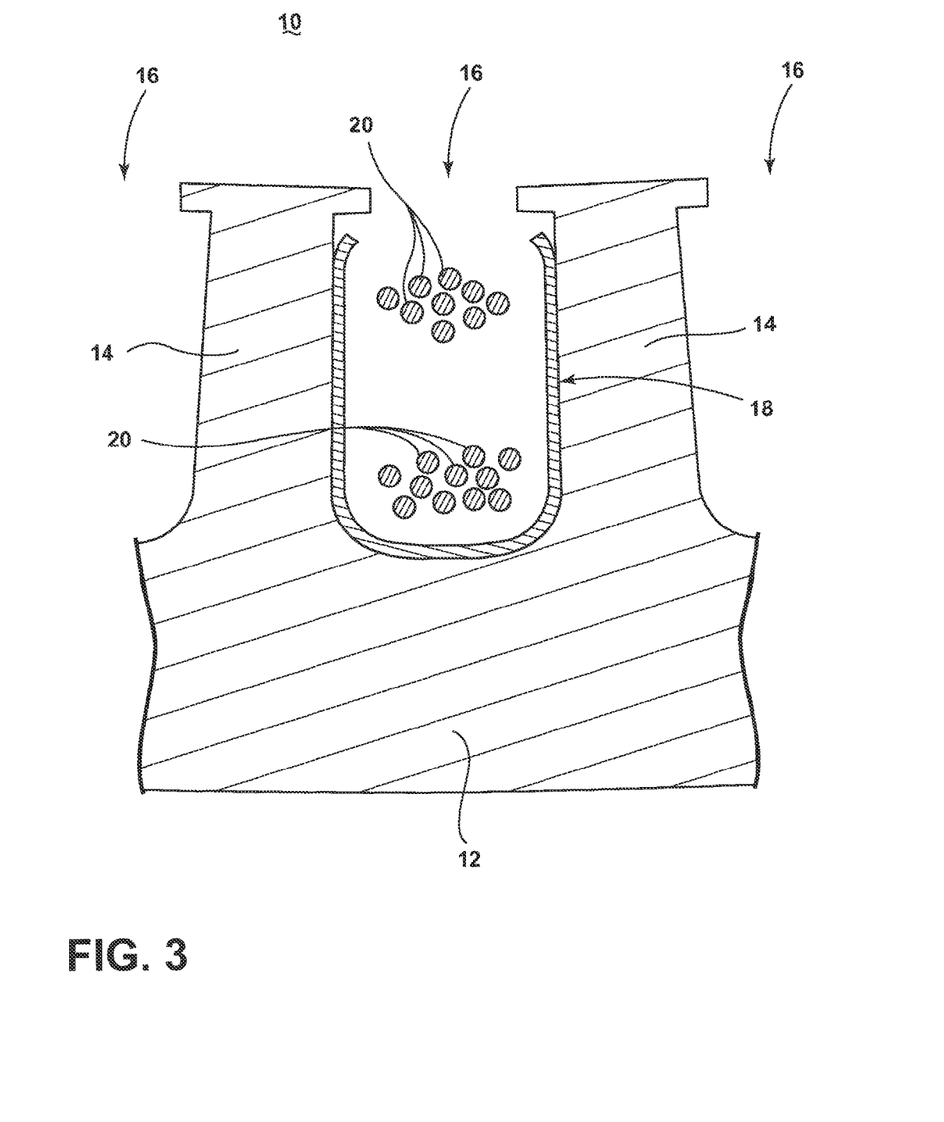
FIG. 3 is a partial sectional view taken along line III-III of FIG. 2 showing a winding slot and slot liner according to the first embodiment of the invention.

FIG. 3 illustrates a sectional view of a configuration of a single winding slot 16 assembled stator 10 having stator windings 20 according to one embodiment of the invention. The stator windings 20 comprise conductive wires (only a few are shown for illustrative purposes) that are wound about the core 12 within the winding slot 16 such that individual sets of windings 20 may be separated from other sets of windings 20 found in adjacent slots 16. Additionally shown, the slot liner 18 isolates the plurality of stator windings 20 from the plurality of teeth 14 and the stator core 12. While only one set of stator windings 20 are shown, it is envisioned that at least one set of windings 20 is wound through at least two of the winding slots 16 to form a configuration wherein the rotation of a magnetic field at the rotor 8 generates a corresponding voltage in the stator windings 20.

Figure 4:
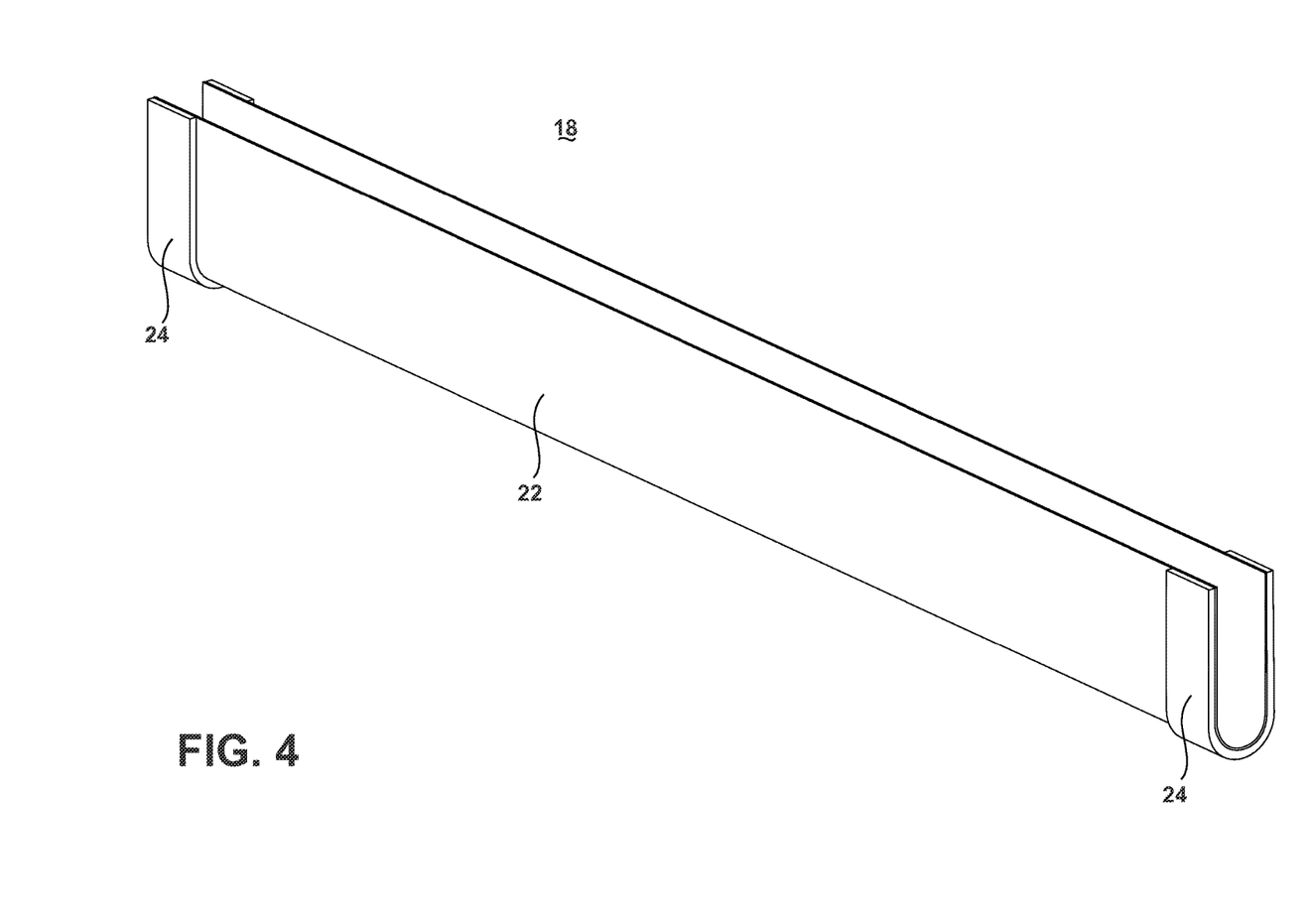
FIG. 4 is a perspective view of the slot liner according to the first embodiment of the invention.

Turning now to FIG. 4, the slot liner 18 comprises an isolating layer 22 that is electrically insulating, yet thermally conductive, and extends along the length of the liner 18 and a strengthening strip 24 provided at each of the liner 18 ends. Upilex-S® may be one example of an isolating layer 22 due to its high dielectric strength, dielectric constant, and thermal conductivity properties. In another instance, the isolating layer 22 may comprise a plurality of layers, formed by lamination or adhesion. In one example of an isolating layer, Upilex-S® has a thermal conductivity of 290 mWatt/meter-K, as measured by the laser flash method. Additionally, at 25 µm thick Upilex-S® layer has a dielectric strength of 6.8 kV at 200° C., as measured by the ASTM D149 test method at 50 Hz testing condition, and a dielectric constant of 3.3 at 200° C., as measured by the ASTM D150 test method at 10 kHz testing condition. A 75 µm thick Upilex-S® layer has a dielectric strength of 11 kV at 200° C., as measured by the ASTM D149 test method at 50 Hz testing condition, and a dielectric constant of 3.2, as measured by the ASTM D150 test method at 10 kHz testing condition. Other isolating layers 22 and layer 22 structures or formation are envisioned. Another alternative isolating layer 22 may be a polyimide boron nitride sheet, which may have a thermal conductivity of at least 1.0 W/meter-K.

The strengthening strip 24 is shown positioned at the opposing ends of the isolating layer 22, and solely on the outer surface of the layer 22. The strengthening strip 24 is coupled with the isolating layer 22 by lamination, adhesive, mechanical couplings, such as fasteners, or by alternate bonding techniques or materials such as a high temperature, high bonding force epoxy. The strengthening strip 24 is formed from an element or material having properties to resist tearing, breaking, or splitting when exposed to a perpendicular force. One example of a material suitable for the strengthening strip 24 may be Nomex® paper Type 410. In this example, a 0.381 mm nominal thickness Nomex® paper Type 410 has an Elmendorf Tear measurement of 9.0 in the machine direction of paper, and an Elmendorf Tear measurement of 16.7 in the cross direction of the paper. Additionally, in this example, the same nominal thickness of Nomex® paper Type 410 has a thermal conductivity of 149 mWatt/meter-K at 150° Celsius, and thus the isolating layer 22 is more thermally conductive than the strengthening strip 24. Alternative materials may be envisioned wherein the thermal conductivity of the isolating layer 22 is greater than or equal to the thermal conductivity of the strengthening strip 24.

Figure 5:
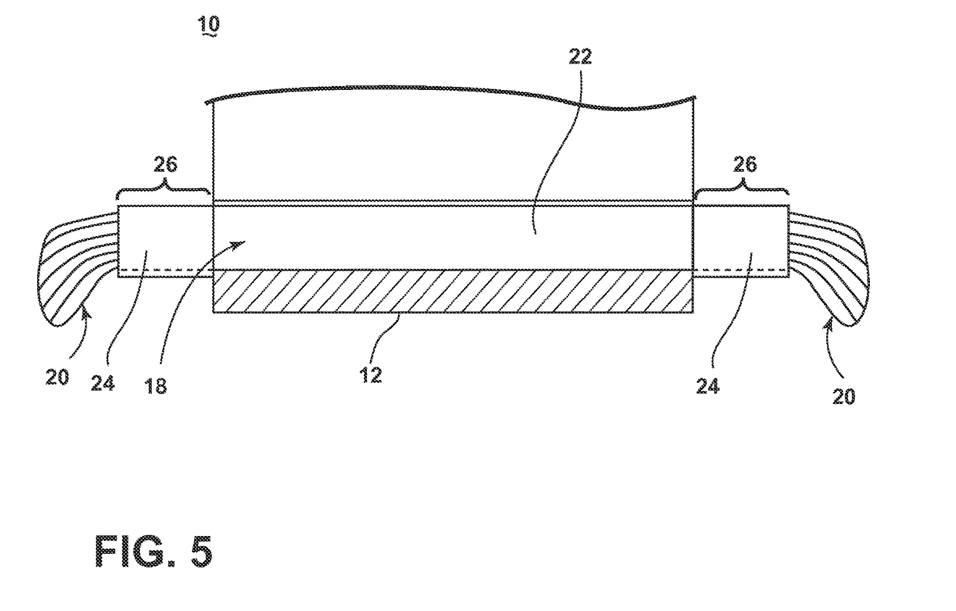
FIG. 5 is a partial sectional view taken along line V-V of FIG. 2 showing a portion of the stator core assembled with a slot liner and stator windings according to the first embodiment of the invention.

FIG. 5 illustrates a cross sectional view of the stator 10 of the electrical machine 6 taken from a surface paralleling with and going through the axis of the stator 10. The slot liner 18 extends in the axial direction of the core 12, such that at least an extended segment 26 of the liner 18 extends past the ends of the core 12. The stator windings 20 further extend from the extended segment 26 of the slot liner 18, and are configured such that the multiple wires in the set of stator windings 20 wrap around a segment of the core 12. As shown, the isolating layer 22 extends over the entire length of the core 12 as well as over the entire length of the extended segment 26 (illustrated as a dotted line in the extended segment 26). Also as shown, the entirety of the strengthening strip 24 lies only beyond the corresponding winding slot 16 and core 12 ends on both sides. Stated another way, the strengthening strip 24 only extends the length of the extended segments 26 on either side of the slot liner 18.

The tight-wrap configuration of the stator windings 20 about the core 12 of the stator 10 generates a bending load on the ends of the slot liner 18. More specifically, a large stress is generated at the corner of the slot liner 18 located at each axial end of the extended segment 26. The strengthening strip 24 resists and disperses the stress generated by the stator windings 20 wrapped about the core 12 by reinforcing and supporting the slot liner 18. For instance, when an automatic winding process wraps the stator windings 20 (not shown) length-wise, along the inner surface of the slot liner 18, the strengthening strip 24 supports the isolating layer 22 to prevent tearing, breaking, or splitting of the layer 22 and/or the strip 24 that extend outside of the core 12 of the stator 10 due to the stress placed on the slot liner 18 by the tension of the stator windings 20. Alternatively, the strengthening strip 24 may reduce the likelihood of tearing, breaking, or splitting of the slot liner, isolating layer 22, and/or strip 24.

During operation of the electric machine 6, the interaction of the rotor 8 with the stator 10 generates current flow through the stator windings 20, which in turn, generates heat in the windings 20. This heat is transferred to the core 12, primarily through the isolating layer 22, which has a high thermal conductivity, as described above. While additional heat may be transferred to the core 12 through the less-thermally-conductive strengthening strips 24, the overall thermal transfer from the stator windings 20 to the core 12 is not inhibited by the strips 24, due to their placement outside of the core 12 ends. Thus, the strengthening strips 24 extend axially outside the core 12 ends with the primary purpose to prevent tearing, breaking, or splitting due to the stress placed on the slot liner 18 by the tension of the stator windings 20, but not necessarily a high thermal transfer between the windings 20 and the core 12, while the isolating layer 22 extends along the axial length of the core 12 with the primary purpose to provide a high thermal conductivity interface between the windings 20 and the core 12.

Figure 6:
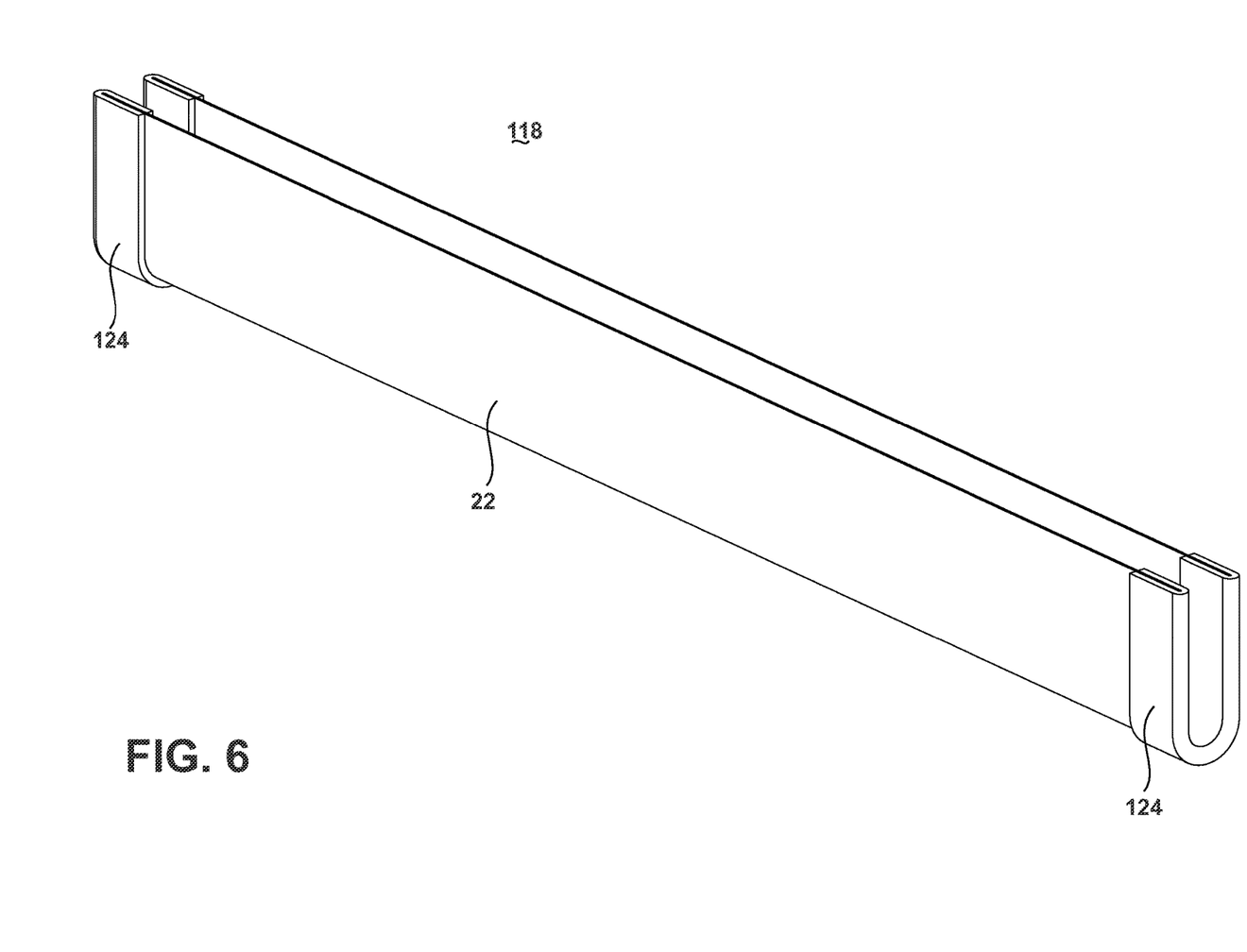
FIG. 6 is a perspective view of the slot liner according to the second embodiment of the invention.

FIG. 6 illustrates an alternative slot liner 118 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the strengthening strip 124 provided at each end of the slot liner 118 wraps around the corresponding isolating layer 22 from the inner surface to the outer surface instead of provided solely on the outer surface of the layer 22, as in the first embodiment.

Many other possible embodiments and configurations in addition to that shown in the above figures are contemplated by the present disclosure. For example, one embodiment of the invention contemplates a slot liner 18 wherein the strengthening strip 24 is provided solely on the inner surface of the isolating layer 22. Additionally, the design and placement of the various components may be rearranged such that a number of different in-line configurations could be realized.

The embodiments disclosed herein provide an electric machine with an improved slot liner. One advantage that may be realized in the above embodiments is that the above described embodiments have superior thermal and electrical operation over the conventional slot liner configurations.

With the proposed configurations, a high thermal conductivity between the stator windings and the stator core can be achieved due to the high thermal conductivity of the isolating layer material described above. Additionally, the high dielectric constant and dielectric strength of the isolating layer reduces or eliminates the likelihood of an electrical short between the stator windings and stator core, even at higher current and voltage generation by the electric machine. The combination of higher conductivity, higher dielectric constant, and higher dielectric strength of the embodiments described herein result in a slot liner which can be used in higher thermal class applications, such as thermal classes higher than 240° C. Thus, another advantage of the above described embodiments is that electric machines having the described slot liners may be driven to generate more power and at higher temperatures than the conventional electric machines.

Furthermore, when designing electric machine systems, an important factor to address is reliability. Another advantage that may be realized in the above embodiments is that the slot liners are less likely to break, rip, or tear at the axial ends due to the increased strength of the strengthening strips in addition to the isolating layer, compared to the strength of solely the isolating layer, making the complete system inherently more reliable. By improving the power generation in the electric machine with the isolating layer and decreasing the likelihood of tearing or breaking of the slot liner with the strengthening strips, the above embodiments described an increased performance and increased reliability electric machine.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure. The primary differences among the exemplary embodiments relate to the slot liner, and these features may be combined in any suitable manner to modify the above described embodiments and create other embodiments.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical machine comprising:
    a rotor;
    a stator having a core with at least one winding slot having an open top and terminating in opposing open ends;
    a slot liner provided within the winding slot and having an electrical insulating element defining an open top and terminating in opposing ends, which extend beyond the slot open ends, and a strengthening strip provided at each of the slot liner ends and solely on an outer surface of the electrical insulating element; and
    wherein the strengthening strip reduces the splitting of the corresponding slot liner end during an automatic winding process, and is coupled with the slot liner via an adhesive.

2. The electrical machine of claim 1 wherein the strengthening strip is bonded to the outer surface of the electrical insulating element.

3. The electrical machine of claim 1 wherein the entirety of the strengthening strip lies beyond the corresponding slot end.

4. The electrical machine of claim 1 wherein the core comprises multiple winding slots, with a slot liner provided in each of the multiple winding slots.

5. The electrical machine of claim 4 further comprising a least one winding comprising electrical wiring wound through at least two of the multiple slots.

6. The electrical machine of claim 1 wherein the electrically insulating element is less thermally conductive than the strengthening strip.

* * * * *